United States Patent [19]
Vaughn et al.

[11] Patent Number: 5,504,461
[45] Date of Patent: Apr. 2, 1996

[54] HIGH SPEED SLOTLINE BPSK MODULATOR

[76] Inventors: Steven A. Vaughn, 29735 Brookfield Dr., Sun City, Calif. 92586; Ronald E. Sorace, 1324 Agate St., #11, Redondo Beach, Calif. 90277

[21] Appl. No.: 378,544

[22] Filed: Jan. 26, 1995

[51] Int. Cl.$^6$ .................................................. H04L 27/20
[52] U.S. Cl. .......................... 332/103; 332/105; 375/279; 375/308
[58] Field of Search ..................... 332/103, 104, 332/105; 375/279, 282, 283, 308

[56] References Cited

U.S. PATENT DOCUMENTS

| | | | |
|---|---|---|---|
| 4,276,521 | 6/1981 | Davidheiser | 332/105 |
| 4,496,918 | 1/1985 | Thorpe | 332/103 |

*Primary Examiner*—Siegfried H. Grimm
*Attorney, Agent, or Firm*—Phyllis Y. Price; Wanda K. Denson-Low

[57] ABSTRACT

A slotline binary phase shift keyed (BPSK) modulator that is capable of operating at high frequency with relatively low sensitivity to terminating impedance. The slotline BPSK modulator comprises a slotline formed in a conductive layer disposed on a substrate, and a pair of diodes coupled to the conductive layer and disposed across the slotline. An RF carrier input signal is coupled to the slotline using a microstrip-to-coplanar line transition that forms one portion of a balanced transformer. The balanced transformer applies the RF carrier input signal with equal amplitude and 180 degree phase difference to each of the diodes. A modulating baseband signal is injected into the microstrip-to-coplanar line transition through a microstrip line and a lumped element low pass filter coupled to the microstrip-to-coplanar line transition. A direct via hole is provided for coupling a baseband modulating signal from the microstrip-to-coplanar line transition to the diodes. An output BPSK signal is extracted through a slotline-to-microstrip transition that forms a second portion of the transformer. The modulator has less sensitivity to terminating impedance and operates at relatively high frequency, on the order of 3.8 gigabits per second.

7 Claims, 2 Drawing Sheets

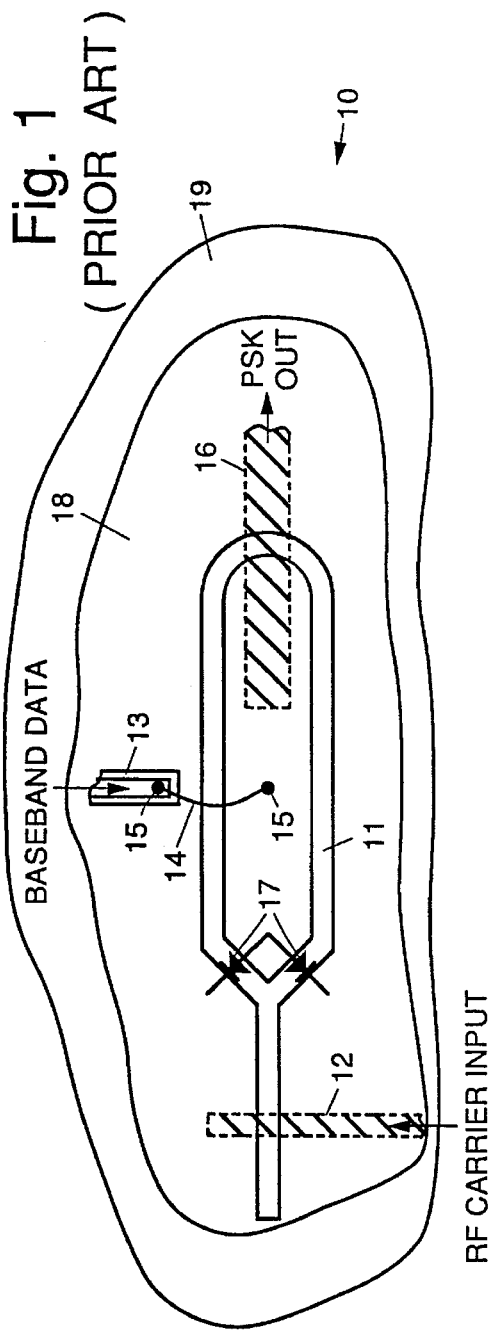
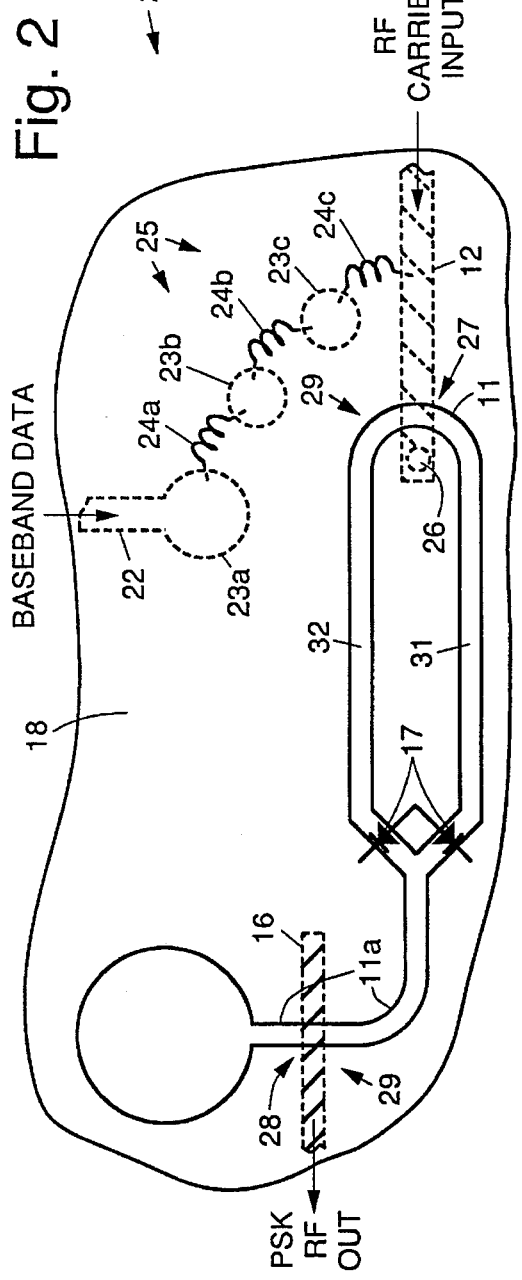

HIGH SPEED SLOTLINE BPSK MODULATOR

BACKGROUND

The present invention relates generally to binary phase shift keyed (BPSK) modulators and particularly to a high frequency, slotline balanced binary phase shift keyed (BPSK) modulator that has less sensitivity to terminating impedance and is capable of operation at a data rate on the order of 3.8 gigabits per second.

A typical conventional slotline modulator that the present invention is intended to replace includes a slotline that comprises an etched metallic surface formed on a first surface of a dielectric substrate that also forms a ground plane, and a pair of diodes disposed across the slotline. A first microstrip line is disposed on a second surface of the substrate and is disposed orthogonal to a portion of the slotline. The first microstrip line couples an RF carrier input signal through the dielectric substrate to the diodes. Baseband data is injected into the diodes using a coplanar waveguide disposed on the first side of the substrate coupled by way of a wirebond connection that is formed across the slotline. The wirebond and coplanar waveguide either form or include a low pass filter. A PSK modulated signal output is provided at a second microstrip line disposed on the second surface of the substrate generally opposite to the location of the first microstrip line through which the carrier input signal is applied. A second microstrip line is oriented orthogonal to the a first microstrip line. This design approach restricts the achievable data rate and rise and fall times due to parasitics that are introduced in the low pass filter.

Accordingly, it is an objective of the present invention to provide for an improved slotline balanced binary phase shift keyed (BPSK) modulator that operates at relatively high speed and has less sensitivity to terminating impedance.

SUMMARY OF THE INVENTION

To meet the above and other objectives of the present invention, a high speed slotline binary phase shift keyed (BPSK) modulator overcomes the problems of conventional modulator designs outlined previously. The present modulator is comprised of a slotline that includes an etched conductive surface formed on a first surface of a dielectric substrate and a pair of diodes coupled to the conductive surface and disposed across the slotline. Baseband modulating data is applied to the diodes by way of a microstrip line, a lumped element filter and a direct via hole connection. The RF carrier input signal is coupled to the slotline by way of a microstrip-to-coplanar line transition that forms a balanced transformer. The balanced transformer applies the RF signal with equal amplitude and 180 degree phase difference to the respective diodes. An output PSK signal is extracted through a slotline-to-microstrip transition. The microstrip-to-coplanar line transition and the slotline-to-microstrip transition are generally aligned with each other instead of being orthogonal to each other as in the conventional design. Input and output ports of the modulator are reversed compared with their locations in the conventional modulator described heretofore. This results in a modulator having less sensitivity to terminating impedance.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows a conventional slotline binary phase shift keyed (BPSK) modulator;

FIG. 2 shows an embodiment of a slotline binary phase shift keyed (BPSK) modulator in accordance with the principles of the present invention;

DETAILED DESCRIPTION

Figure 3:
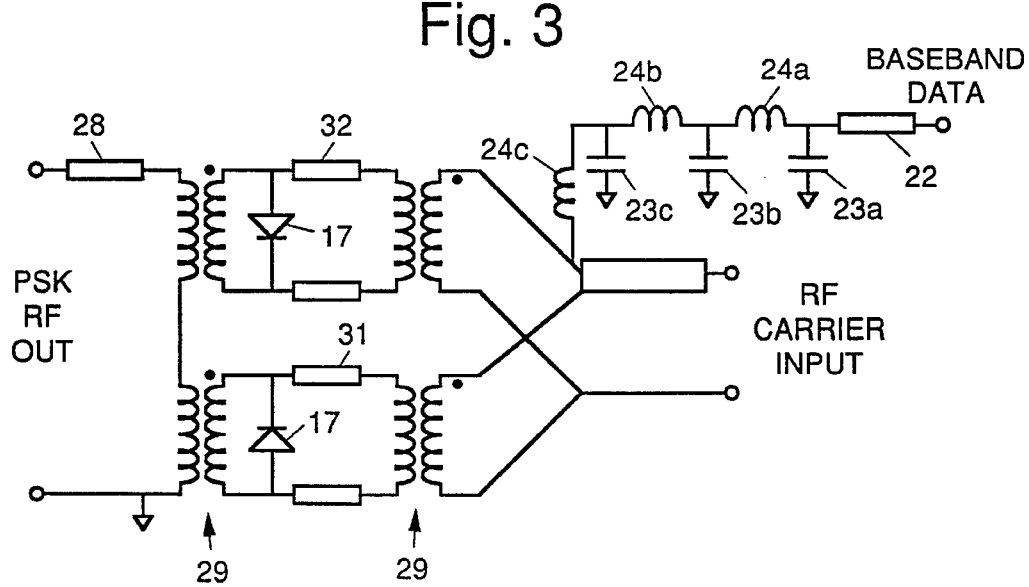
FIG. 3 shows an equivalent schematic diagram of the slotline BPSK modulator of FIG. 2.

Referring to the drawing figures, FIG. 1 shows a conventional slotline binary phase shift keyed (BPSK) modulator 10. The conventional binary phase shift keyed (BPSK) modulator 10 includes a slotline 11 that comprises an etched metallic surface 18 formed on a first (top) surface of a dielectric substrate 19 that also forms a ground plane 18, and a pair of diodes 17 disposed across the slotline 11. A first microstrip line 12 is disposed on a second (bottom) surface of the dielectric substrate 19 and is disposed orthogonal to a portion of the slotline 11. The first microstrip line 12 couples a carrier input signal through the dielectric substrate 19 to the diodes 17. Baseband data is injected into the diodes 17 using a coplanar waveguide 13 disposed on the first side of the substrate 19. The baseband data is coupled by way of a wirebond connection comprising a wire 14 that is formed across the slotline 11 and two wire bonds 15. A low pass filter is formed by the wirebond connection and coplanar waveguide 13 or is included as part of the coplanar waveguide 13. A PSK modulated output signal is coupled to a second microstrip line 16 disposed on the second surface of the substrate 19. The second microstrip line 16 is generally disposed opposite to the location of the first microstrip line 12 to which the carrier input signal is applied. This conventional modulator 10 restricts the achievable data rate and rise and fall times due to parasitics that are introduced in the low pass filter.

Referring to FIG. 2, an embodiment of an improved slotline binary phase shift keyed (BPSK) modulator 20 in accordance with the principles of the present invention is shown. The present slotline modulator 20 comprises a dielectric substrate 19 having a slotline 11 formed in a conductive surface 18 disposed on a first surface thereof. A pair of diodes 17 are coupled to the conductive surface 18 and are disposed across the slotline 11. A curved portion 11a of the slotline is formed for use in coupling PSK modulated output signals from the modulator 20.

A first microstrip line 12 is disposed on a second (bottom) surface of the dielectric substrate 19 that forms a microstrip-to-coplanar line transition 27. An RF carrier input signal is coupled into the slotline 11 by way of the microstrip-to-coplanar line transition 27 formed by the first microstrip line 12.

A second microstrip line 16 is disposed on the second surface of the substrate 19 that forms a slotline-to-microstrip transition 28. The second microstrip line 16 is oriented orthogonal to the curved portion 11a of slotline 11 and is generally parallel to the main portion of the slotline 11. The second microstrip line 16 is used to output PSK modulated output signals.

A third microstrip line 22 is disposed on the second surface of the substrate 19 to provide a baseband data input to the modulator 20. A lumped element filter 25 is comprised of a group of capacitors 23a, 23b, 23c and fine wire inductors 24a, 24b, 24c is coupled between the third microstrip line 22 and the first microstrip line 12. The first, second and third microstrip lines 12, 16, 22 are formed on the second surface of the substrate 19. A direct connection via hole 26 is disposed through the substrate 19 and interconnects the microstrip-to-coplanar line transition 27 formed by the first microstrip line 12 to the ground plane 18, and hence couples modulated data to the slotline 11.

In operation, the baseband modulating data or signal is applied to the diodes 17 by way of the third microstrip line 22, the lumped element filter 25, the first microstrip line 12, and the direct via hole 26. The RF carrier input signal is coupled into and out of the slotline 11 by way of the microstrip-to-coplanar line transition 27 and slotline-to-microstrip transition 28 which form a balanced transformer 29. The balanced transformer 29 applies the RF signal with equal amplitude and 180 degree phase difference to each of the diodes 17.

The modulating baseband signal is injected into the first microstip line 12 through the lumped element low pass filter 25. The lumped element low pass filter 25 has a cutoff frequency that is approximately three times the data rate ($f_c \sim 10$ GHz) of the modulator 20. The output BPSK signal is extracted through the slotline-to-microstrip transition 28 formed by the second microstrip line 16. Input and output ports of the modulator 20 are coupled to the respective microstrip lines 12, 16 (transitions 27, 28) and are reversed compared to their locations in the conventional modulator 10 described with reference to FIG. 1. Thus, the present modulator 20 has less sensitivity to terminating impedance.

FIG. 3 shows an equivalent schematic diagram of the slotline BPSK modulator 20 of FIG. 2. Corresponding elements are shown in the schematic of FIG. 3 having the same reference numerals as in FIG. 2. In addition to those components previously described, two portions 31, 32 of the slotline 11 are also identified in FIGS. 2 and 3, although they were not mentioned with reference to the description of FIG. 2.

Figure 4:
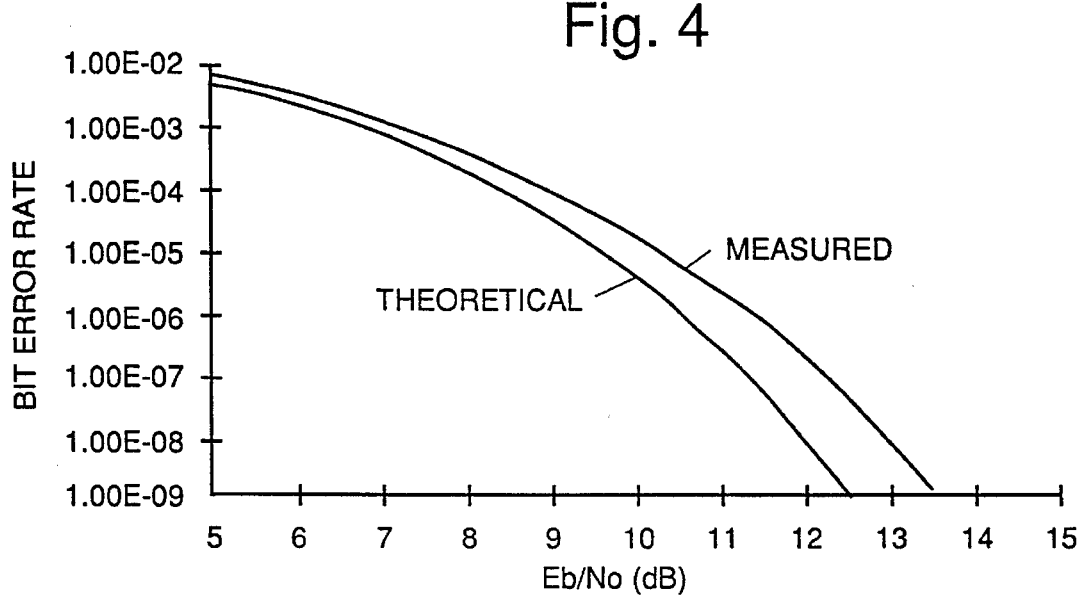
FIG. 4 shows the bit error rate (BER) performance of the modulator of FIG. 2, measured at a carrier frequency of 19.6 GHz.

A K-band (20 GHz) BPSK modulator 20 operating at 3.8 gigabits per second has been built and tested. The amplitude balance of the modulator 20 was measured at 0.3 dB and phase balance was measured at <2.0 degrees. Carrier suppression was better than 35 dB resulting in a modulation loss (a measure of modulator efficiency) of less than 0.4 dB. FIG. 4 shows bit error rate (BER) performance of the modulator 20 of FIG. 2, measured at a carrier frequency of 19.6 GHz.

Thus, a new and improved high frequency, high speed, slotline balanced binary phase shift keyed (BPSK) modulator that has less sensitivity to terminating impedance and is capable of operation at a data rate of on the order of 3.8 gigabits per second has been described. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A slotline binary phase shift keyed (BPSK) modulator comprising:

a dielectric substrate;

a slotline formed in a conductive surface disposed on a first surface of the dielectric substrate;

a pair of diodes coupled to the conductive surface and disposed across the slotline;

a first microstrip line disposed on the second surface of the substrate that forms a microstrip-to-coplanar line transition for receiving RF carrier signals;

a second microstrip line disposed on the second surface of the dielectric substrate distal from the first microstrip line that forms a slotline-to-microstrip transition for outputting PSK output signals;

a third microstrip line disposed on the second surface of the substrate for receiving baseband modulating signals;

a filter disposed on the second surface of the substrate that is coupled between the third microstrip line and the first microstrip line; and a via hole disposed through the substrate interconnecting the first microstrip line and the ground plane to couple modulated data to the slotline.

2. The modulator of claim 1 wherein the slotline comprises a curved portion and the second microstrip line is coupled to the slotline across the curved portion.

3. The modulator of claim 2 wherein the second microstrip line is oriented orthogonal to the curved portion.

4. The modulator of claim 1 wherein the filter comprises a lumped element filter including a plurality of capacitors interconnected by fine wire inductors.

5. The modulator of claim 1 wherein the microstrip-to-coplanar line transition and slotline-to-microstrip transition form a balanced transformer.

6. The modulator of claim 5 wherein the balanced transformer applies the RF carrier signals with equal amplitude and 180 degree phase difference to the respective diodes.

7. The modulator of claim 1 wherein the lumped element low pass filter has a cutoff frequency approximately three times the data rate of the modulator.

* * * * *